US006600593B2

(12) United States Patent
Pedersen

(10) Patent No.: US 6,600,593 B2
(45) Date of Patent: *Jul. 29, 2003

(54) METHOD AND AN APPARATUS FOR AMPLITUDE EQUALIZATION OF A PLURALITY OF OPTICAL SIGNALS

(75) Inventor: Claus F. Pedersen, Frederiksberg (DK)

(73) Assignee: Tellabs Denmark A/S, Ballerup (DK)

( * ) Notice: Subject to any disclaimer, the term of this patent is extended or adjusted under 35 U.S.C. 154(b) by 0 days.

This patent is subject to a terminal disclaimer.

(21) Appl. No.: 10/155,658

(22) Filed: May 24, 2002

(65) Prior Publication Data

US 2002/0145794 A1 Oct. 10, 2002

Related U.S. Application Data

(63) Continuation of application No. 09/269,466, filed as application No. PCT/DK97/00405 on Sep. 25, 1997, now Pat. No. 6,417,956.

(51) Int. Cl.[7] .............................. H04B 10/12; H01S 3/30
(52) U.S. Cl. ..................................... 359/334; 359/337.1
(58) Field of Search .................................. 359/334, 182, 359/187, 337.1; 385/140; 372/3, 6

(56) References Cited

U.S. PATENT DOCUMENTS

| 4,977,620 | A | | 12/1990 | Smith et al. .................. 455/619 |
|---|---|---|---|---|
| 5,239,607 | A | * | 8/1993 | da Silva et al. ........... 359/337.12 |
| 5,515,192 | A | | 5/1996 | Watanabe ...................... 359/124 |
| 5,548,436 | A | | 8/1996 | Ramachandran et al. ... 359/187 |
| H1791 | H | * | 3/1999 | Williams ...................... 385/140 |
| 6,160,657 | A | | 12/2000 | Lee et al. ...................... 359/334 |
| 6,175,436 | B1 | * | 1/2001 | Jackel .......................... 359/124 |
| 6,417,956 | B1 | * | 7/2002 | Pedersen ...................... 359/334 |

FOREIGN PATENT DOCUMENTS

| DE | 4016331 | 11/1991 |
|---|---|---|
| EP | 0261876 | 3/1988 |

OTHER PUBLICATIONS

Fishman et al. "Degredations Due to Stimulated Brillouin Scattering in Multigigabit Intensity–Modulated Fiber–Optic Systems." J Lightwave Tech. 11:Nov. 11, 1993, pp. 1721–1728.*

Lichtman et al. "Stimulated Brillouin Scattering Excited by a Modulated Pump Wave in Single–Mode Fibers." J. Lightwave Tech 7:Jan. 1, 1989, pp. 171–174.*

(List continued on next page.)

Primary Examiner—Thomas G. Black
Assistant Examiner—Andrew R. Sommer
(74) Attorney, Agent, or Firm—Baker Botts L.L.P.

(57) ABSTRACT

In a method of amplitude equalization of a plurality of optical signals having mutually different wavelengths, the optical signals are launched into a first end of an optical fiber (5). The optical signals are amplified, before being launched into the fiber (5), to a level at which at least one of the signals exceeds a stimulated Brillouin scattering (SBS) threshold value ($T_{SBS}$) characteristic of the fiber, so that part of the signal energy in the fiber is transferred to a Stokes signal propagating in the fiber (5) in a direction opposite to said optical signals. An apparatus for amplitude equalization of a plurality of optical signals having mutually different wavelengths comprises an optical fiber (5) having an input end (6) where said optical signals may be supplied to the fiber, and an output end (10) where said optical signals may be tapped from the fiber after equalization. The fiber (5) has a characteristic stimulated Brillouin scattering (SBS) threshold value ($T_{SBS}$) which corresponds to a preselected maximum amplitude value of the optical signals on the output end (10) of the fiber.

20 Claims, 3 Drawing Sheets

OTHER PUBLICATIONS

Tkach et al. "Performance of a WDM Network Based on Stimulated Brillouin Scattering." Photonics Tech. Lett. 1:May 5, 1989, pp. 111–113.*

Mao et al. "Stimulated Brillouin Threshold Dependence on Fiber Tyype and Uniformity." Photonics Tech. Lett. 4:Jan. 1, 1992, p 66–69.*

Aoki et al. "Input Power Limits of Single–Mode Optical Fibers due to Stimulated Brillouin Scattering in Optical Communication Systems." J. Lightwave Tech. 6:May 5, 1988, pp. 710–719.*

Cowle, G. J. and Stepanov, D. Y. "Brillouin/Erbium Fibre Lasers for Multiple Wavelength Generation, " 22nd European Conf. on Optical Comm., ECOC 1996, pp. 3.313–3.316, 1996.

Richards, D. H., et al. "A Theoretical Investigation of Dynamic All–Optical Automatic Gain Control in Multichannel EDFA's and EDFA Cascades", IEEE J. Selected Topics in Quantum Electronics, 1027–1036.

PCT Search Report Jul. 21, 1998.

* cited by examiner

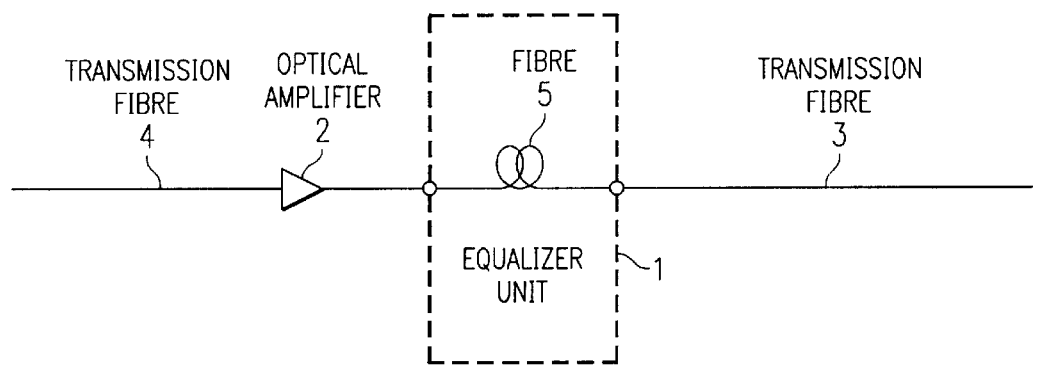
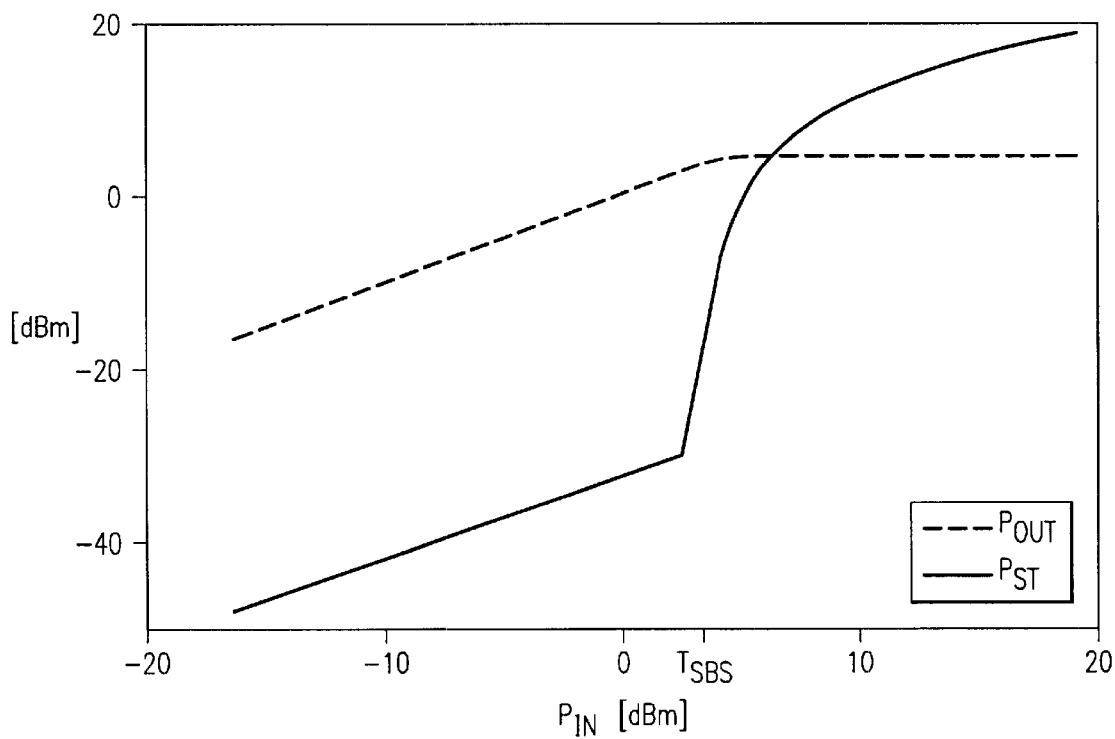

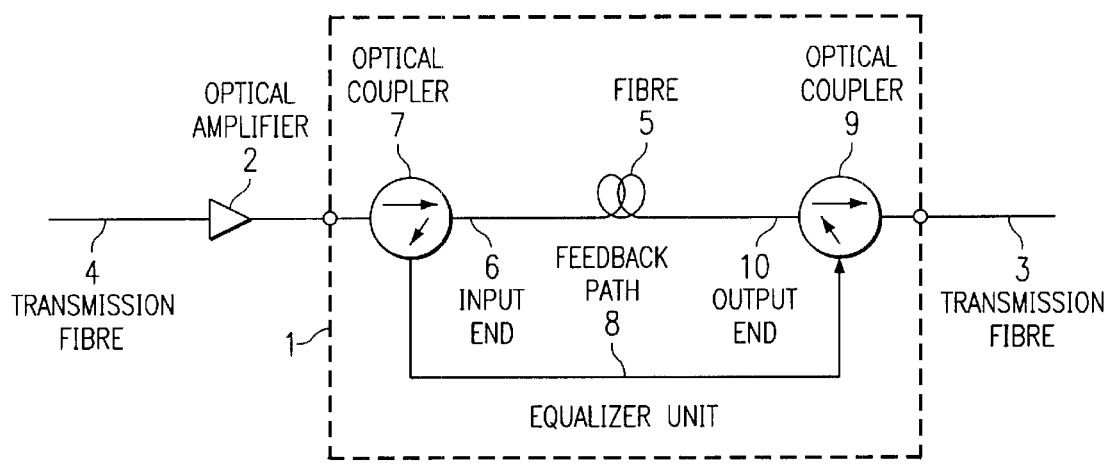
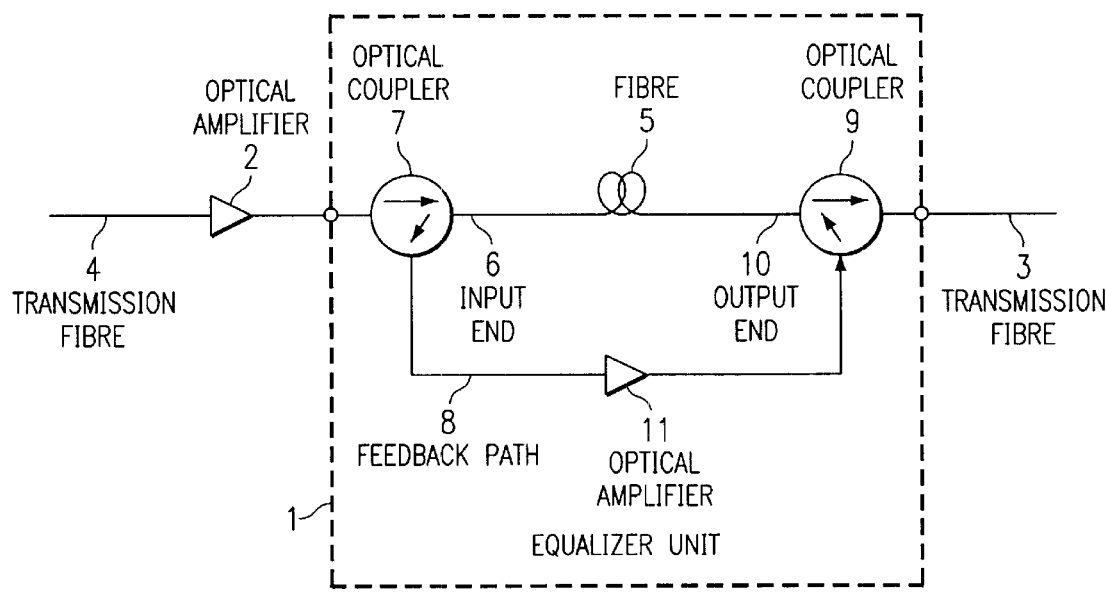

METHOD AND AN APPARATUS FOR AMPLITUDE EQUALIZATION OF A PLURALITY OF OPTICAL SIGNALS

RELATED APPLICATIONS

The present application is a continuation application of U.S. application Ser. No. 09/269,466 filed Dec. 21, 1999 now U.S. Pat. No. 6,417,956 issued Jul. 9, 2002, which claims the benefit of PCT Application No. PCT/DK97/00405 filed Sep. 25, 1997 from Denmark Application No. 1048/96 filed Sep. 26, 1996.

TECHNICAL FIELD OF THE INVENTION

The invention concerns a method of amplitude equalization of a plurality of optical signals having mutually different wavelengths, said optical signals being launched into a first end of an optical fibre, and a corresponding apparatus.

BACKGROUND OF THE INVENTION

Optical line amplifiers are increasingly used in long optical transmission cables instead of traditional electrical regenerators. One of the advantages of the optical amplifiers is that they can be used in wavelength division multiplexed (WDM) systems to simultaneously amplify a large number of individual transmission signals having different wavelengths within the gain band of the optical amplifier, which will typically be an erbium doped fibre amplifier (EDFA).

For wavelength division multiplexed applications, however, a serious problem is that erbium doped fibre amplifiers in general have a certain gain variation over the gain band, which means that the various wavelengths will not experience quite the same gain. Of course, this problem is aggravated when several amplifiers are coupled in cascade, and, therefore, this limits the number of optical amplifiers which can be cascaded, as the gain variation over the gain band will practically be the same for all the amplifiers in the cascade.

The gain variation may e.g. have as a result that, at the receiver end of an optical cable, the signal level of the signal or signals subjected to the lowest gain en route, will be below the detection or sensitivity limit of the optical receiver arranged there, so that the signal cannot be received. It may also occur that the signal level of the signal or signals subjected to the highest gain en route, will exceed the non-linearity limit of the system, in which case severe signal distortions will appear. Possibly, the amplifiers en route may be adapted to reduce their gain to a level below the specified one; but, the effect of this is just that low gain signals are reduced additionally. Finally, when the signal levels are different, crosstalk from the strong to the weak signals may increase, so that the quality of the weak signals may degrade to an unacceptable degree.

It is known to counteract this by performing equalization on e.g. the output of an optical amplifier.

European Patent Application EP 543 314 teaches a solution wherein equalization is performed by passing the optical signal having the different wavelengths, which may have been subjected to disuniform gain, through a polarization independent acoustically tuned optical filter (PIATOF). Immediately before or after this filter, a small part of the optical signal is tapped for a demultiplexer, in which the individual wavelengths are separated and converted into corresponding electrical signals. Then, on the basis of these electrical signals, a control circuit determines a plurality of coefficients associated with the respective wavelengths. The coefficients are fed to the polarization independent acoustically tuned optical filter, which can then attenuate each individual wavelength depending on the coefficient associated with the wavelength concerned.

However, this solution has the serious drawback that the optical signals must be converted into electrical signals, and that the entire signal processing then takes place purely electrically. The electrical control circuit for the polarization independent acoustically tuned optical filter is rather complex and thus expensive to implement, and the conversion into electrical signals moreover results in increased inaccuracy. One of the advantages of optical fibre amplifiers is precisely that they operate purely optically, and this advantage will therefore be lost if, nonetheless, the optical signals have to be converted into electrical signal owing to the equalization.

Another solution is known from European Patent Application EP 685 946 describing an optical amplifier having a circulator with three ports. Two of the ports constitute the input and the output, respectively, of the amplifier, while the third port is connected to an optically amplifying fibre. Spectrally selective Bragg grating reflectors are formed at specific intervals along the fibre. The intervals between the reflectors are chosen such that each wavelength is reflected back to the circulator at a distance in inverse proportion to the gain per unit length of the wavelength concerned in the fibre. As a result, all wavelengths are amplified by the amplifier to the same extent. While this solution can operate purely optically, it is a static solution, as the individual reflectors must be placed in the fibre in advance on the basis of the knowledge of the amplifier gain at the individual wavelengths. Thus, it is not possible to allow for gain variations because of fibre parameter tolerances and especially not the dynamic variations which will always occur in practice in such an amplifier, i.a. because of saturation.

A Stimulated Brillouin Scattering (SBS) effect is known per se, but is normally considered as a deleterious effect because it limits the maximal optical power that can be transmitted through an optical fibre.

However, applications utilizing the SBS effect to achieve desired effects are also known. As an example, DE 40 16 331 mentions a Brillouin fibre amplifier utilizing the effect for selective frequency. A similar use is described in U.S. Pat. No. 4,977,620, while U.S. Pat. No. 5,515,192 mentions an optical signal generator that can be amplitude modulated between levels which are above and below the SBS threshold value, respectively, so that the SBS effect only occurs when the signal exceeds the threshold value.

The SBS effect, however, is only utilized with a single optical frequency in these known applications. Systems with several optical frequencies are not mentioned in relation to the SBS effect.

SUMMARY OF THE INVENTION

Accordingly, an object of the invention is to provide a method and an optical amplifier of the type stated in the opening paragraph, which are capable of operating purely optically, while being capable of performing dynamic equalization of the individual channels in a wavelength division multiplexed system.

This is achieved according to the invention by a method, wherein the optical signals, before being launched into the fibre, are amplified to a level at which at least one of the signals exceeds a stimulated Brillouin scattering (SBS) threshold value characteristic of the fibre, so that part of the signal energy in the fibre is transferred to a Stokes signal propagating in the fibre in a direction opposite to said optical signals.

When at any rate one of the optical wavelengths exceeds the SBS threshold value, this will be attenuated in the fibre owing to the SBS effect, as the signal will substantially be reduced to the threshold value at the wavelength or wavelengths exceeding the threshold value. The reason is that the SBS effect is sufficiently narrow-banded for it to occur for each individual wavelength independently of the signals at the other wavelengths. The excess part of the signal will be converted into the oppositely directed Stokes wave. The wavelengths whose amplitude does not exceed the threshold value, will pass the fibre with just a quite slight attenuation or no attenuation at all. This ensures that the amplitude of the strongest signal or signals is attenuated with respect to the others, so that amplitude equalization takes place.

When the optical signals are amplified to a level at which all the signals exceed said threshold value, it is ensured that all the signals are attenuated to the same level, which, in turn, substantially corresponds to the SBS threshold value, so that complete equalization takes place.

In an embodiment, said Stoke signal or signals are tapped from the fibre at its first end and are fed back to the second end of the fibre, thereby generating an SBS laser. This reduces the SBS threshold value, and it may moreover be regulated in response to the SBS laser cavity parameters, which are determined by the fibre type selected. The reason is that the Stokes signal is increased considerably owing to the feedback, which stabilizes the SBS process. The use of an SBS laser moreover permits a shorter interaction length of the fibre in which the SBS process takes place, which will reduce the effect of other non-linear phenomena, such as FWM (Four Wave Mixing) or SPM (Self Phase Modulation).

In a preferred embodiment, said Stokes signals are amplified in the feedback from the first end of the fibre to its second end in an optical amplifier. This results in a further stabilization of the SBS effect and a further reduction in the threshold value. One reason is that the optical amplifier may be used for generating noise which can stimulate and average the SBS process.

As the information content in said optical transmission systems is usually transferred by modulating each of said optical wavelengths, it may occur that each channel has a bandwidth which exceeds the SBS bandwidth, since, as mentioned before, the SBS effect is very narrow-banded. In that case, only the part of the channel spectrum within the SBS bandwidth will be attenuated, which means that the signal will be distorted. This may be counteracted by varying each of said mutually different wavelengths periodically about a nominal wavelength. Since the SBS effect has a certain inherent sluggishness, the SBS bandwidth of each individual wavelength will hereby be increased so that at any rate most of the channel spectrum will be within the SBS bandwidth, thereby obviating or reducing the distortion.

As mentioned, the invention also concerns an apparatus for amplitude equalization of a plurality of optical signals having mutually different wavelengths. The apparatus comprises an optical fibre having an input end where said optical signals may be supplied to the fibre, and an output end where said optical signals may be tapped from the fibre after equalization.

When the fibre has a characteristic stimulated Brillouin scattering (SBS) threshold value which corresponds to a preselected maximum amplitude value of the equalized optical signals on the output end of the fibre, it is ensured that optical signals exceeding the SBS threshold value will be attenuated in the fibre owing to the SBS effect, as the signal at the wavelength or wavelengths exceeding the threshold value will be substantially reduced to the threshold value. The reason is that the SBS effect is sufficiently narrow-banded for it to occur for each individual wavelength independently of the signals at the other wavelengths. The excess part of the signal will be converted into an oppositely directed Stokes wave. The wavelengths whose amplitude does not exceed the threshold value, will pass the fibre with a quite slight attenuation or no attenuation at all. This ensures that the amplitude of the strongest signal or signals is attenuated with respect to the others, so that amplitude equalization takes place.

Further, when the optical signals at the input end of the fibre are caused to have a level at which all these signals exceed said threshold value, it is ensured that all the signals are attenuated to the same level, which in turn substantially corresponds to the SBS threshold value, so that complete equalization takes place.

Further, when the apparatus comprises means for feedback of optical signals from said input end to said output end, said Stokes signals may be fed back, thereby generating an SBS laser. This reduces the SBS threshold value, which will simultaneously be more stable and may be regulated depending on the SBS laser cavity parameters, which are determined by the fibre type selected. The reason is that the Stokes signal is increased considerably owing to the feedback, which stabilizes the SBS process.

In a preferred embodiment, said feedback means comprise an optical amplifier. This results in a further stabilization of the SBS effect and a further reduction in the threshold value. One reason is that the optical amplifier may be used for generating noise which can stimulate and average the SBS process. The optical amplifier may expediently be an erbium doped fibre amplifier.

BRIEF DESCRIPTION OF THE DRAWINGS

The invention will now be explained more fully below with reference to the drawing, in which FIG. 1 shows a first embodiment of the invention with an equalizer unit containing an optical fibre, FIG. 2 shows the optical power of an optical output signal from a fibre and a Stokes signal, respectively, as a function of the power of an optical of signal on the input of the fibre, FIG. 6 shows an embodiment in which the Stokes signal is fed back, thereby generating an SBS laser, and FIG. 7 shows an embodiment in which an optical amplifier is inserted in the feedback path of the Stokes signal.

DETAILED DESCRIPTION OF THE INVENTION

Figure 3:
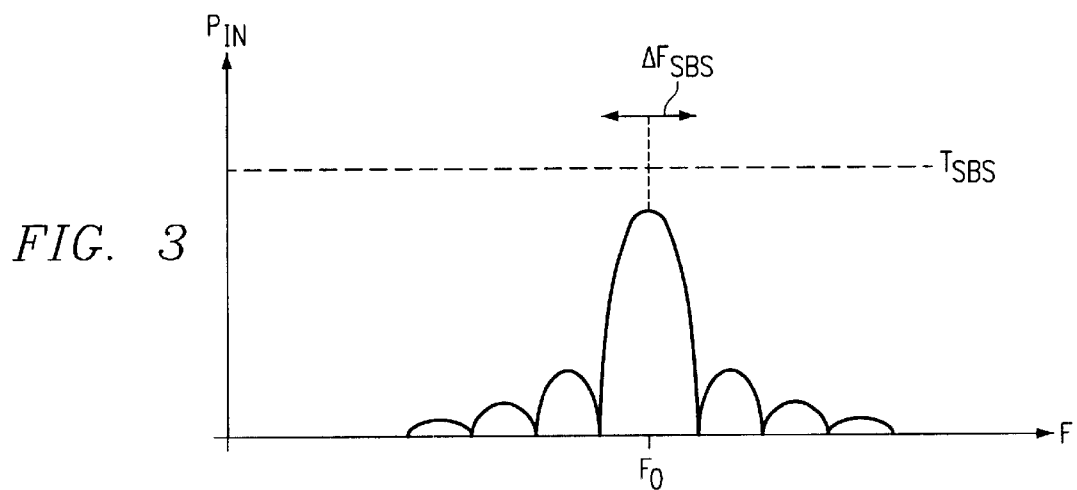
FIG. 3 shows an example of the SBS bandwidth of a modulated optical signal.

FIG. 1 shows an example of how an equalizer unit 1 of the invention may be used, it being inserted here between the output on an optical amplifier 2 and a transmission fibre 3. The input on the optical amplifier 2 is connected to another transmission fibre 4, from which it receives optical signals which are amplified in the optical amplifier 2 and are then to be transmitted on the fibre 3.

Typically, such an optical amplifier is employed in a wavelength division multiplexed system, in which optical signals having mutually different wavelengths are simultaneously transferred. Since, however, a certain variation in the gain over the gain band occurs for the optical amplifiers normally used, such as e.g. erbium doped fibre amplifiers (EDFA), the different wavelengths—if they had the same strength on the input of the amplifier—will no longer have the same amplitude after having passed the amplifier, since each of them has experienced a different gain. For example, the gain variation over the gain band for a typical amplifier may be 1–3 dB, and cascading of ten amplifiers of the same type may thus result in gain variations of 10–30 dB, which will usually not be acceptable.

To remedy this problem, the equalizer unit 1 may thus be interposed between the output on the amplifier 2 and the transmission fibre 3, as shown in FIG. 1. The equalizer unit 1 contains a fibre 5 whose dimensions and materials are adapted such that it has a predetermined threshold value for stimulated Brillouin scattering (SBS), as will be described more fully below.

Stimulated Brillouin scattering is a non-linear effect that can occur in optical fibres, and which manifests itself in that an optical signal above a determined threshold value, typically of the order of 0–20 dBm (1–100 35 mW), begins to generate an oppositely directed signal at a slightly higher wavelength. The signal generating the gain is usually called a pump signal and the oppositely directed signal a Stokes signal. When the process begins, energy will be transferred from the pump signal to the Stokes signal, whereby the pump signal is reduced to the threshold value in practice. Usually, SBS is an undesired effect; but, here, it is utilized instead to achieve a desired effect, viz. equalization of the amplitudes of the optical wavelength division multiplexed signals.

SBS may be characterized as a parametric interaction between the pump signal or the pump wave, the Stokes wave and an acoustic wave. The pump wave generates an acoustic wave by electrostriction and thereby gives rise to a periodic modulation of the refractive index of the fibre. This modulation of the refractive index scatters the pump light by Bragg diffraction, and the scattered light, which becomes the Stokes wave, is downshifted in frequency because of the Doppler shift, which takes place because the Bragg grating moves at the acoustic velocity.

For a single-mode fibre, the scattered light will in practice just move in a direction opposite to the pump wave, and it therefore becomes the oppositely directed Stokes wave. For a typical silica fibre the Doppler shift is about 11 GHz. The SBS process proceeds spontaneously and unstably when the power of the pump signal is smaller than the SBS threshold value. When the power of the pump signal is greater than the SBS threshold value, the SBS process begins to proceed stably, and a great part of the pump power is transformed into a Stokes wave. When the SBS process proceeds stably, a population inversion is generated in the optical fibre. This population inversion is capable of amplifying oppositely directed waves in a relatively narrow frequency band around the frequency of the Stokes wave, i.e. the frequency of the pump signal minus 11 GHz.

FIG. 2 shows the relation between the pump signal power $P_{in}$ at the input of the fibre in which the SBS process takes place, and respectively the power $P_{out}$ of the same signal after passage of the fibre and the Stokes signal power $P_{st}$ when it is tapped at the output of the fibre. It will be seen clearly from this that $P_{out}$ will practically be equal to $P_{in}$ at low signal levels of the pump signal, which means that there is practically no attenuation when the signal passes the fibre. It also appears that the Stokes signal assumes very small values at these levels, since the process just proceeds spontaneously and unstably here.

When the pump signal power exceeds the threshold value $T_{SSS}$, it will be seen that the Stokes signal increases strongly, while, on the other hand, the Pout curve becomes horizontal, as the part of the pump signal power exceeding the threshold value is transferred to the Stokes signal.

The spectral width of the SBS gain is called the SBS band and is typically of the order of 100 MHz plus the possible spectral width of the pump signal. Because of the relatively narrow spectral width of the SBS process, SBS interaction for a wideband signal will just occur in the frequency interval or intervals where the signal power level is above the SBS threshold in a bandwidth of about 30 100 MHz. This must be considered very narrow-banded in this connection, since the individual wavelengths in a wavelength division multiplexed optical system will usually have a spacing significantly greater than that corresponding to a frequency difference of 100 MHz. It is 35 the circumstance that the SBS effect is so narrow-banded which makes it suitable for amplitude equalization of the individual wavelengths, as the effect will occur for the individual wavelengths separately. If the SBS threshold is e.g. selected so that a single one of the wavelengths exceeds the SBS threshold, while the others are below this threshold, the effect will just occur for the wavelength which is above. Therefore, the other wavelengths will not be affected, and an equalizing effect will thus be obtained. If the threshold is selected so that it is exceeded by all the wavelengths, all of these will be reduced to the threshold value, resulting in complete equalization of the signal levels. For further elaboration of the stimulated Brillouin scattering principle, reference is made to the technical literature.

Figure 4:
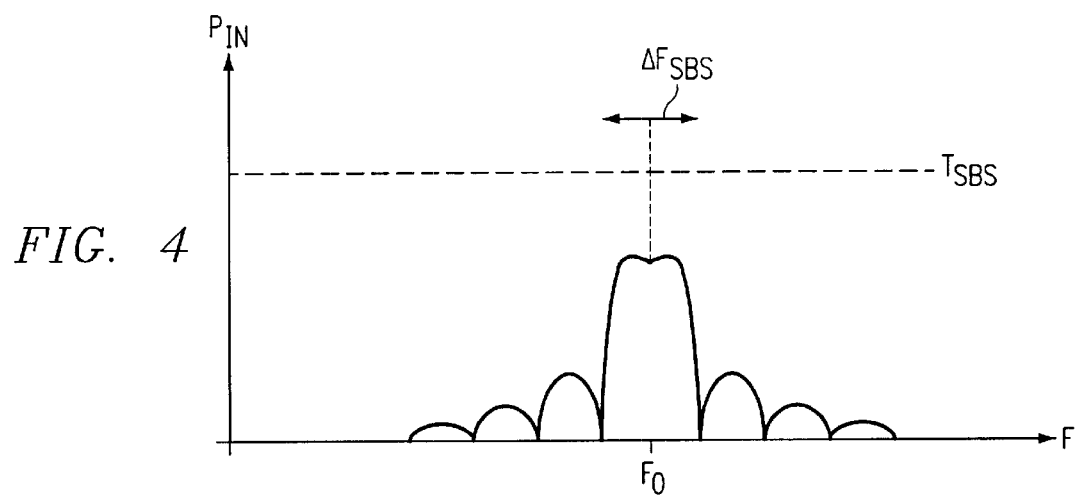
FIG. 4 shows the signal of FIG. 3 after having passed an equalizer unit, when no frequency broadening is used.

On the other hand, the very narrow bandwidth of the SBS effect also involves a drawback, as it "may cause distortion of the signals. The reason is that the information content in optical transmission systems is usually transferred by modulating the various optical wavelengths, which, in the frequency domain, will thus be in the nature of carrier waves having a surrounding frequency spectrum. The modulation principle may e.g. be ASK, PSK or FSK, i.e. amplitude, phase or frequency modulation. In case of amplitude modulation, the spectrum may e.g. have the appearance shown in FIG. 3, which, however, is not drawn entirely to scale for clarity, since the carrier wave will usually be considerably larger in relation to the rest of the spectrum than shown by the figure. In the example, just the carrier wave having the frequency $f_o$ exceeds the SBS threshold value $T_{SBS}$, and the bandwidth for the SBS effect $)f_{SBS}$ will therefore be about 100 MHz, as mentioned above. This means that the part of the spectrum which is within $)f_{SBS}$ will be attenuated, while the rest of the spectrum will pass the SBS fibre unchanged. This results in strong distortion of the signal, as appears from FIG. 4, which shows the spectrum on the SBS fibre output. This distortion can prevent correct detection of the modulated signals. In case of other modulation forms, the spectrum may look differently, and the distortion will accordingly assume other forms; but the problem will be the same.

Figure 5:
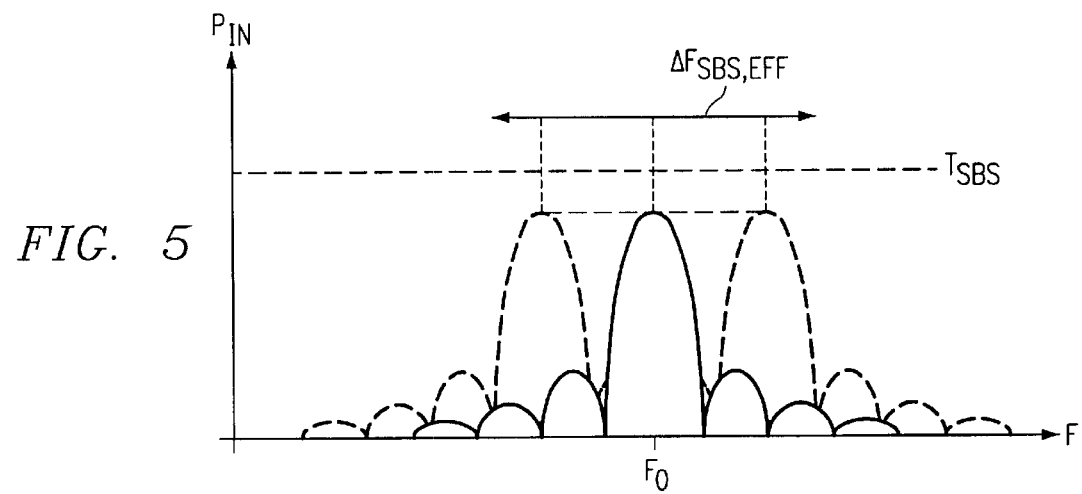
FIG. 5 shows an example of how frequency broadening of a modulated optical signal may be performed.

This may be obviated by varying the carrier wave frequency about the nominal value $f_o$, thereby introducing spectral broadening of the pump signal. This is illustrated in FIG. 5. It is turned to account here that the acoustic wave, which is decisive for the SBS process to take place, has a certain attenuation time, and accordingly the process an inherent sluggishness. If the carrier wave frequency is varied e.g. periodically with a period time which is shorter than the attenuation time of the acoustic wave, it is ensured that the effective SBS bandwidth)$f_{SBS,eff}$ is broadened to cover a significantly greater part of the spectrum. This is likewise shown in FIG. 5. The frequency variation is selected so that it has the same size as the desired broadening of the SBS bandwidth. The frequency variation will typically be made at the transmitter side of the optical transmission connection.

In the embodiment of the invention described above and shown in FIG. 1, the SBS effect takes place in a fibre 5, which is dimensioned to have a specific SBS threshold value. It is well-known from the technical literature how this dimensioning may be made, and it will therefore just be mentioned that it depends on the material coefficients of the fibre, its length and cross-sectional area and on the wavelength of the pump light used.

FIG. 6 shows an alternative embodiment in which the Stokes signals are tapped at the input-end 6 of the fibre 5 by means of an optical coupler 7, said Stokes signals moving in a direction opposite to the pump signal in the fibre, as mentioned. The coupler 7 is adapted to allow light in a direction from the optical amplifier 2 to pass into the fibre, while light in a direction from the fibre, at least as regards the relevant wavelengths, is tapped and fed back to the output end 10 of the fibre via a feedback path 8, which may optionally also be an optical fibre. At the output end 10, it is coupled into the fibre again by means of a second optical coupler 9, which is adapted to allow light from the fibre 5 to pass to the transmission fibre 3 and to couple light from the feedback path 8 into the fibre 5.

The feedback of the Stokes signals generates a so-called SBS laser, where the Stokes signal level in the fibre 5 will be increased considerably, which stabilizes the SBS process. In particular for pump signals which exceeds the SBS threshold value, the SBS process may be unstable because of unstable transformation of pump power to Stokes power. However, it has been demonstrated that when the Stokes power has a size corresponding to more than 70% of the pump signal, the SBS process becomes stable. The SBS process will therefore be considerably more stable when the Stokes signal is fed back. Simultaneously, the threshold value is reduced because of the stronger Stokes signal, and this means that a shorter fibre will suffice for a given threshold value, because the threshold value is inversely proportional to the length of the fibre.

A further improvement may be obtained when an optical amplifier 11 is introduced into the feedback path 8, as shown in FIG. 7. The amplifier 11 may e.g. be an erbium doped fibre amplifier (EDFA). This can then amplify the Stokes signal in the feedback path and thereby increase the effect of the feedback described above. In addition to the increased effect, it will also be possible to regulate the SBS threshold value by regulating the gain in the amplifier 11, as a stronger Stokes signal gives a lower threshold value, as described above, and vice versa. Particularly when installing a transmission system, it may be expedient that the SBS threshold value may be regulated.

In the embodiments described above, the equalizer unit is positioned immediately after the output on an optical amplifier. As mentioned, many of these amplifiers may be arranged in cascade on long transmission cables, and an equalizer unit may then be arranged after each amplifier. Depending on the gain the gain variation of the amplifiers over the gain band, it may, however, perhaps be sufficient to arrange equalizer unit(s) at a single or a few of the amplifiers. It will also be possible to place an equalizer unit immediately in front of an amplifier or an optical receiver.

Finally, it should be noted that the invention may also be applied in connection with the use of bi-directional transmission of optical signals on a fibre length, the only condition being that the wavelengths of the various pump and Stokes signals do not coincide.

What is claimed is:

1. A method for equalizing an amplitude of an optical signal in a fiber optic link, comprising:
    amplifying a first optical signal;
    amplifying a second optical signal, the second optical signal having an amplitude exceeding a stimulated Brillouin scattering threshold value of the fiber optic link;
    launching the first and second optical signals into an input end of the fiber optic link;
    propagating a Stokes signal from an output end of the fiber optic link, the amplitude of the second optical signal being reduced to the stimulated Brillouin scattering threshold value of the fiber optic link in response to the Stokes signal.

2. The method of claim 1, further comprising:
    transferring the Stokes signal from the input end of the fiber optic link back to the output end of the fiber optic link along a feedback path.

3. The method of claim 2, wherein the feedback path includes an optical fiber.

4. The method of claim 2, further comprising:
    amplifying the Stokes signal.

5. The method of claim 4, further comprising:
    regulating a gain in the Stokes signal amplification.

6. The method of claim 1, further comprising:
    adjusting the stimulated Brillouin scattering threshold value of the fiber optic link.

7. The method of claim 1, wherein the first optical signal has an amplitude exceeding the stimulated Brillouin scattering threshold value of the fiber optic link, the amplitude of the first optical signal being reduced to the stimulated Brillouin scattering threshold value of the fiber optic link in response to the Stokes signal.

8. The method of claim 1, wherein the first and second optical signals have different wavelengths.

9. The method of claim 1, wherein the first optical signal has an amplitude that does not exceed the stimulated Brillouin scattering threshold value of the fiber optic link, the amplitude of the first optical signal not being affected by the Stokes signal.

10. The method of claim 1, further comprising:
    varying wavelengths of the first and second optical signals about a nominal wavelength.

11. An equalizing unit for equalizing an amplitude of an optical signal in a fiber optic link, comprising:
    a fiber optic link operable to receive a first optical signal and a second optical signal, the second optical signal having an amplitude that exceeds a stimulated Brillouin scattering threshold value of the fiber optic link, the fiber optic link operable to propagate a Stokes signal in an opposite direction to the first and second optical signals, the fiber optic link operable to reduce the amplitude of the second optical signal to the stimulated Brillouin scattering threshold value of the fiber optic link in response to the Stokes signal.

12. The equalizing unit of claim 11, further comprising:
    a first coupler at an input end of the fiber optic link;
    a second coupler at an output end of the fiber optic link;
    a feedback link coupled to the first and second couplers, the feedback link operable to feedback the Stokes signal from the first coupler at the input end of the fiber optic link to the second coupler at the output end of the fiber optic link.

13. The equalizing unit of claim 12, further comprising:

an amplifier coupled to the feedback link, the amplifier operable to amplify the Stokes signal prior to its feedback to the second coupler.

14. The equalizing unit of claim 13, wherein the amplifier is operable to adjust the stimulated Brillouin scattering threshold value of the fiber optic link.

15. The equalizing unit of claim 12, wherein the feedback link is an optical fiber.

16. A system for equalizing an amplitude of an optical signal in a fiber optic link, comprising:

means for amplifying a first optical signal;

means for amplifying a second optical signal, the second optical signal having an amplitude exceeding a stimulated Brillouin scattering threshold value of the fiber optic link;

means for launching the first and second optical signals into an input end of the fiber optic link;

means for propagating a Stokes signal from an output end of the fiber optic link, the amplitude of the second optical signal being reduced to the stimulated Brillouin scattering threshold value of the fiber optic link in response to the Stokes signal.

17. The system of claim 16, further comprising:

means for transferring the Stokes signal from the input end of the fiber optic link back to the output end of the fiber optic link along a feedback path.

18. The system of claim 16, further comprising:

means for amplifying the Stokes signal.

19. The system of claim 16, further comprising:

means for adjusting the stimulated Brillouin scattering threshold value of the fiber optic link.

20. The system of claim 16, further comprising:

means for varying wavelengths of the first and second optical signals about a nominal wavelength.

* * * * *

UNITED STATES PATENT AND TRADEMARK OFFICE
CERTIFICATE OF CORRECTION

PATENT NO. : 6,600,593 B2
DATED : July 29, 2003
INVENTOR(S) : Claus F. Pedersen

It is certified that error appears in the above-identified patent and that said Letters Patent is hereby corrected as shown below:

Column 6,
Line 6, after "on the other hand, the" delete "Pout" and insert -- $P_{OUT}$ --.

Signed and Sealed this

Twenty-second Day of March, 2005

JON W. DUDAS
*Director of the United States Patent and Trademark Office*